United States Patent [19]
Kelada

[11] Patent Number: 6,080,313
[45] Date of Patent: Jun. 27, 2000

[54] POINT-OF-USE WATER PURIFICATION SYSTEM WITH A CASCADE ION EXCHANGE OPTION

[76] Inventor: Maher I. Kelada, P.O. Box 2247, Pearland, Tex. 77581

[21] Appl. No.: 08/920,842

[22] Filed: Aug. 29, 1997

[51] Int. Cl.[7] .................................................. C02F 9/00
[52] U.S. Cl. .................... 210/631; 210/662; 210/663; 210/664; 210/748; 210/85; 210/89; 210/202; 210/259; 210/266; 210/282; 210/284; 210/288
[58] Field of Search .................... 210/631, 662, 210/663, 664, 669, 748, 202, 232, 241, 259, 266, 282, 284, 288, 85, 89

[56] References Cited

U.S. PATENT DOCUMENTS

| | | | |
|---|---|---|---|
| 3,519,134 | 7/1970 | Hassinger | 210/449 |
| 3,870,033 | 3/1975 | Faylor et al. | 210/664 |
| 4,179,616 | 12/1979 | Coviello et al. | 210/748 |
| 4,504,389 | 3/1985 | Rundzaitis | 210/266 |
| 4,659,460 | 4/1987 | Muller et al. | 210/284 |
| 4,670,144 | 6/1987 | McCausland et al. | 210/284 |
| 4,735,716 | 4/1988 | Petrucci et al. | 210/288 |
| 4,876,014 | 10/1989 | Malson | 210/668 |
| 4,894,154 | 1/1990 | Roz | 210/266 |
| 4,898,667 | 2/1990 | Diman et al. | 210/138 |
| 4,976,876 | 12/1990 | Diman et al. | 210/791 |
| 5,024,766 | 6/1991 | Mahmud | 210/668 |
| 5,039,402 | 8/1991 | Himelstein | 210/266 |
| 5,190,569 | 3/1993 | Wang | 210/663 |
| 5,271,837 | 12/1993 | Discepolo et al. | 210/282 |
| 5,443,721 | 8/1995 | Kelada et al. | 210/232 |
| 5,529,689 | 6/1996 | Korin | 210/232 |
| 5,573,666 | 11/1996 | Korin | 210/232 |
| 5,597,482 | 1/1997 | Melyon | 210/209 |

*Primary Examiner*—Ivars Cintins
*Attorney, Agent, or Firm*—Russell J. Egan

[57] ABSTRACT

A modular water treatment and purification system, suitable for home use, is connected to a water supply and contains a closed fluid treatment circuit extending to a water outlet. The closed fluid circuit flows through a plurality of replaceable water treatment modules each having a specific water treatment function, such as the removal of a particular material from the water by the use of filtration, carbon adsorption, ion exchange or the addition of a chemical to balance the desired water conditions. Preferably the circuit also includes traversing a radiation device, for example an ultra violet light, for the purpose of sanitizing the water.

41 Claims, 10 Drawing Sheets

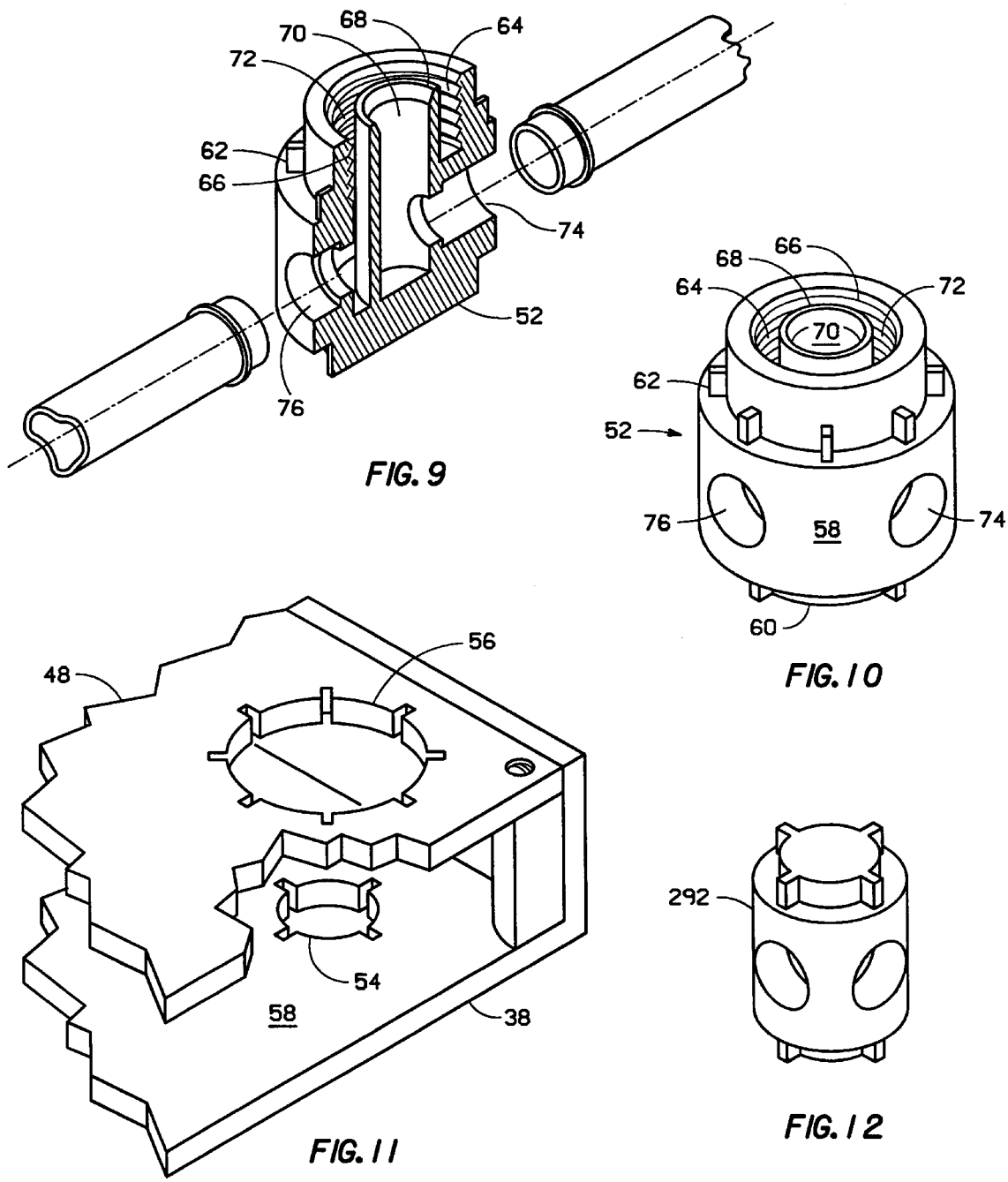

POINT-OF-USE WATER PURIFICATION SYSTEM WITH A CASCADE ION EXCHANGE OPTION

BACKGROUND OF THE INVENTION

1. The Field of the Invention

The present invention pertains to methods and systems for water treatment and purification and, in particular, to domestic units which are readily adaptable to treat local water in accordance with any existing long term or varying temporary condition to produce water of high purity and to a flowboard for controlling fluid distribution in the system.

2. The Prior Art

The availability of quality potable water is becoming an increasing national and world concern. There are many areas where local water has been subject to mismanagement and the quality thereof has gone down dramatically to the point that it may be dangerous for human consumption. There also are areas, such as west Texas, where natural fluorides occur at such high levels that the water will adversely affect the teeth of young children leaving them with discolored teeth for life. There are still other areas, such as the Dakotas, where the water naturally contains high levels of sulfides making the water practically undrinkable to many. Further there are periodic local and/or regional occurrences, such as the weather related natural disasters of flooding and hurricanes, when local water supplies may become contaminated and at least temporarily unsafe for drinking. Theretofore the accepted solution to these problems has been the importation of bottled water. This often is at great cost and bottled water may not always be available, such as in times of natural disasters when both water supplies and modes of transportation are damaged. Further, there is no assurance that any imported bottled water will have acceptable purity as there currently are no federal, state, or local standards in force which would have to be met by the bottlers.

Impurities in natural raw waters (surface or well water) occur in four basic different forms, namely non-ionic and undissolved impurities; ionic and dissolved impurities; gaseous impurities; and biological impurities. Each of these impurities requires separate treatment techniques and equipment for their removal.

Non-ionic and undissolved impurities include, but are not limited to, turbidity, silt, mud, suspended solids, organic matter, bacteria, oil, colloidal matter and colloidal silica. A common technique to remove such impurities is filtration using a wide variety of coarse and fine filter media. Some other techniques include coagulation, sedimentation and adsorption on activated charcoal or carbon. In raw water treatment it is customary to use a coarse filter (sand and anthracite) followed by a fine filter (cartridge), and then to treat the waiter with activated carbon to remove organic matter. In cases using pretreated water, such as municipal water supply, the first filtration with course sand is generally unnecessary.

Ionic and dissolved impurities include a wide variety of salts dissolved in water and dissociated to form positive ions, called cations, and negative ions, called anions. The major cations in natural raw water are calcium, magnesium, sodium, potassium, ammonium, iron and manganese. The major anions are carbonate, bicarbonate, hydroxide, chloride, sulfate, nitrate, phosphate, and silica. Both of these lists are intended to be representative and should not be considered in any way as all inclusive. Both the positive ions and the negative ions combine in various fashion to form a large group of compounds which would dictate the treatment process for their removal. For example, calcium and magnesium form carbonates which, in turn, cause water hardness. Water containing large amounts of carbonates must be softened to prevent fouling and clogging of equipment and other separation media.

Natural waters also include traces of different heavy metals. Several means are used to partially or completely remove such impurities. U.S. Pat. No. 5,190,659 to Wang, discussed below, is a good example of water conditioning, or partial treatment, for removal of these metals. Complete removal of metal impurities requires other techniques, such as evaporation, membrane separation and ion exchange.

Gaseous impurities include a number of gases that are soluble in water. Some are found naturally in well water, such as carbon dioxide, hydrogen sulfide, and methane. Others are the result of water purification or industrial application and include such gases as ammonia, oxygen and chlorine. In these cases, aeration, oxidation, stripping or an oxidating catalyst, such as manganese green sand zeolite, is usually a practical means for removing the dissolved gases.

Biological impurities include all types of microorganisms, bacteria, viruses, and pyrogen. Several disinfection methods are available for treating this type of impurity including boiling (limited to small volumes), chlorination, ozonation and ultraviolet radiation.

In most cases, all of these four forms of impurities coexist simultaneously and in differing amounts and their relative proportions can vary, even seasonally. No single treatment or technique is adequate for or capable of removing all impurities in one step. Multiple related or interdependent processes are normally required to rid water from such impurities.

Generally these processes must be constantly monitored to assure each form of impurity is being properly treated and removed.

Examples of known approaches to water treatment systems and apparatus are described in the following patents.

U.S. Pat. No. 4,504,389 to Rundzaitis discloses a water filter mounted on a faucet and containing therein a replaceable filter cartridge having four stages. The dwell time of water passing through this device would bring its effectiveness into question.

U.S. Pat. No. 4,876,014 to Malson describes a counter top unit for producing pure water. It utilizes a multi chamber filed with purification media (ion exchange) to purify an aqueous media, a disinfectant ultraviolet source, and means for measuring the purity of the aqueous media. No provision is made for regeneration or replacement of the purification media after exhaustion.

U.S. Pat. No. 4,894,154 to Roz discloses an individual portable water treatment device having a cartridge for filtering suspended materials, an active carbon charge, a charge of anion and cation exchange resins and a bacteria filtering cartridge.

U.S. Pat. Nos. 4,898,667, and 4,976,876, both to Diman et al, relate to point-of-use membrane filtration systems used for micro filtration, ultrafiltration or hyper filtration, depending upon the membrane pore size. The automatic control system is programmed to accomplish purge, rinse-up and sanitization procedures at predetermined intervals with predetermined combinations of procedures.

U.S. Pat. No. 5,024,766 to Mahmud has, as an objective, to maintain the purity of an ultra pure water source at a low Total Organic Carbon (TOC) and bacteria at point-of-use. A purified water source with specific resistance of 17–18 meg ohm/cm is required. The point-of-use system includes a circulation loop that contains a pump, an ultraviolet unit, a 0.2 micron filter, a twin mixed bed polisher, and an ozone generator sterilizer.

U.S. Pat. No. 5,190,659 to Wang has, as its object, to provide a point-of-entry (POE) water conditioning system. The proposed system will partially treat water contaminants. It is not intended to produce high purity water. The primary components are the vessels for filter media (a wide array of reactive and regenerative compounds are disclosed with each compound intended to treat specific problems), a process tank for regeneration and chemical circulation, a central flow control (without a description of how it works), a pump and ultraviolet units.

U.S. Pat. Nos. 5,529,689 and 5,573,666, both to Korin, describe filtration/sterilization assemblies which comprise a filtration and ultraviolet sterilization cartridge repalceably disposed within a filtration housing. The dwell time of water passing through these devices would bring their effectiveness into question.

U.S. Pat. No. 5,597,482 to Melyon describes a water purification apparatus that comprises an elongated ultraviolet lamp, for disinfecting, extending into a surrounding hollow tube. Both the lamp and tube are placed in an annulus formed of filter media disposed within a filtration housing. The dwell time for water passing through this device would give rise to questions of its effectiveness.

It is an object of the present invention to provide a method and system for point-of-use, counter top water conditioning and purification. The subject method and system are primarily intended for residential and lower volume commercial markets by improving the aesthetic quality of water and controlling, or substantially eliminating, any and all ionic and/or microbiological contamination naturally occurring in the raw water. Each unit has a flowboard which can be specially configured for the local water supply with replaceable cartridges for filtration, adsorption, reverse osmosis, ion exchange, and biological disinfection. The flowboard also allows configuration for providing additives to the water during treatment. The unit can be provided with digital instrumentation. Operational safety and ease of maintenance are key features of the present invention.

SUMMARY OF THE PRESENT INVENTION

The present invention is a modular water treatment and purification system suitable for home, office, or laboratory use. The system is connected to a water supply and drain, an electrical supply, and treats the local water in a closed fluid treatment circuit extending from inlet to outlet. The closed fluid circuit includes a flowboard upon which plurality of water treatment modules are mounted. Each module is readily replaceable and the flowboard controls the sequential flow of water through the modules. The modules each have a specific treatment function, such as the removal of a particular material from the water by the use of micro filters or the addition of a chemical to balance the desired water conditions. The order of the modules is not critical to the present invention, with the exception that modules to be treated with backflow must be appropriately mounted on those portions of the flowboard which provide backflow. Preferably the closed fluid circuit also includes a radiation device, for example an ultraviolet light, for the purpose of sanitizing the water as it flows there by.

Several independent water conditioning and treatment processes are used within the subject system. Basic operations for most units would include, but not be limited to: sediment and turbidity removal by filtration; organic and gas removal by carbon adsorption; dissolved impurities removal by reverse osmosis and/or ion exchange; and biological control by ultraviolet light. Each operating unit can be uniquely configured to accommodate for local water conditions while insuring ease of maintenance, value and performance. Moreover, all residential system embodiments are counter-top mounted and have compact, functional and aesthetically pleasing stylizing.

The subject system incorporates a uniquely designed mounting base, called a flowboard. The flowboard contains a plurality of receptacles each of which receiver a respective one of a plurality of single ended cartridges or modules vertically therein. The flowboard also contains pipe means interconnecting the receptacles and provided with linear valve means controlling flow of water through the flowboard.

It is therefore an object of the present invention to produce a water treatment system having a sediment filter/activated carbon cartridge; a series of cascadin, ion exchange cartridges and sub-micron filter cartridges; and an ultraviolet element for water disinfection and resulting in production of high purity water. Each cartridge is readily replaceably mounted on a flowboard and the ion exchange cartridges are rechargeable. Preferably the ion exchange elements are assembled in an easily replaceable cartridge pack. A fission exchange cartridge pack could produce an amount of purified water equivalent to 20–30 five gallon water bottles. Thus this system will be economically competitive with bottled water.

It is a further object of the present invention to produce a counter-top water conditioning unit consisting of sediment filter, activated carbon element, anion resin and activated silica element for nitrate, organics, fluoride and heavy metal removal, sub-micron filter and an ultraviolet element for water disinfection for the production of high purity water from raw water supplies in an economical and efficient fashion.

It is another object of the present invention to produce a limited capacity counter-top water purification unit, utilizing membrane separation technology, consisting of a sediment filter, activated carbon element, reverse osmosis element, and an ultraviolet element for water disinfection.

It is yet another object of the present invention to produce a high capacity counter top unit for producing high purity water utilizing membrane and ion exchange separation technologies, consisting of a sediment filter, an activated carbon element, a reverse osmosis element, a mixed bed ion exchange element, and an ultraviolet element for water disinfection.

It is a still further object of the present invention to produce a dispensing unit for high purity water suitable for indoor public facilities (shopping centers, institutions, recreational facilities, etc.). These units will produce hot or cold water of high purely to be dispensed for sale in 8–12 oz cups. Water carbonization and/or flavoring is another option It is yet another object of the present invention to produce a portable water purification kit suitable for travel and/or emergency use.

It is still another object of the present invention to teach a flowboard which will receive thereon a plurality of single ended water treatment modules and, utilizing unique linear valve assemblies, control flow of water through these modules in such manner as to effect the maximum water treatment efficiency.

BRIEF DESCRIPTION OF THE DRAWINGS

The present invention will now be described, by way of example, with reference to the accompanying drawings, in which;

FIG. 9 is a perspective view, partially broken away, of a cartridge mounting assembly of the present invention;

FIG. 10 is a perspective view, similar to FIG. 9, of a cartridge mounting assembly of the present invention;

FIG. 11 is a perspective view of a portion of the flowboard of the present invention with one side wall removed to show the interior of the flowboard assembly;

FIG. 12 is a perspective view of a pipe branch fitting;

DETAILED DESCRIPTION OF AN EMBODIMENT OF THE INVENTION

The present invention concerns a method, apparatus and total system for purifying water and is particularly directed to an apparatus and system which are of such size as to be suitable for domestic counter top use. The embodiment shown in the figures is intended as a counter mounted model readily placed in any domestic environment, such as homes, coffee rooms of offices and the like. All that is required for installation is a connection to a local water source, a water drain, and an electrical power source.

Figure 1:
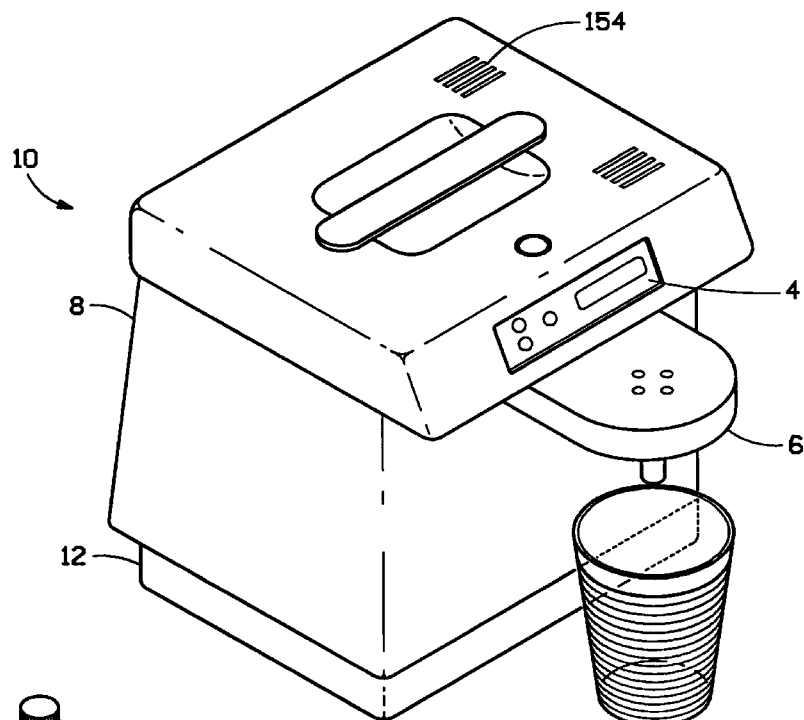
FIG. 1 is a front isometric view of an embodiment of the counter top water conditioning unit according to the present invention.
Figure 2:
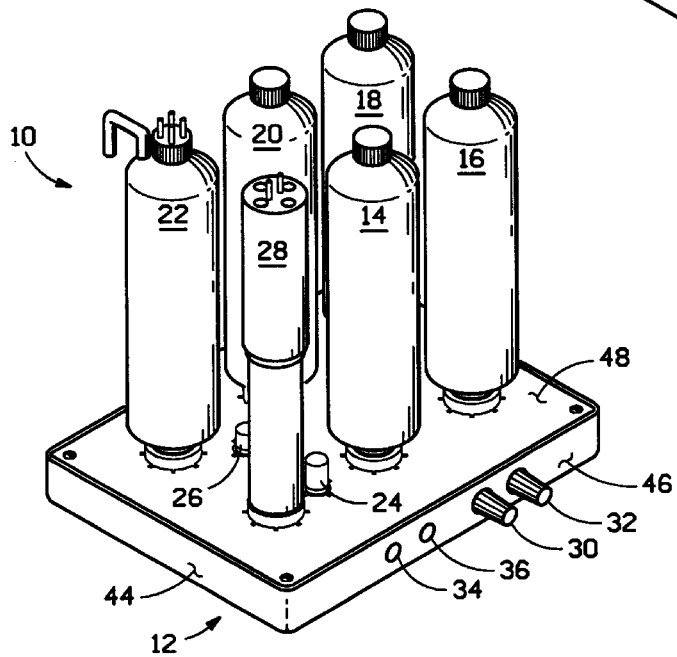
FIG. 2 is a rear isometric view of the embodiment of present invention shown in FIG. 1 with the cover removed.

Turning now to FIGS. 1 to 3 and 11, the illustrated embodiment of the subject water purification system 10 has a flowboard 12 forming a support for a plurality of generally bottle shaped cartridges including, but not restricted to, a sediment filter cartridge 14, an activated carbon filter cartridge 16, an ion exchange cartridge 18, a submicron filter cartridge 20, and a disinfection chamber cartridge 22. It should be noted that the number and type of cartridges can vary in accordance with both the condition of the available water supply and user requirements. For example, while some of the cartridges can be for removing materials from the water, others can be provided for adding treatment and/or conditioning materials to the water. The number of cartridges shown and discussed is representative and kept at a low number for the sake of simplicity in both the drawings and description. The order of the cartridges in the closed flow loop is generally not critical to the present invention. However, the flowboard can be configured to back flow water through at least some of the cartridges, as will be discussed later, in which case the cartridges to be back flushed must be in specified locations. Also provided on the flowboard are a solenoid actuated flow control valve 24, an optional flow meter 26, cooling fan/thermo electric device assembly 28, linear valve assemblies 30, 32 and inlet port 34 and a drain port 36. A cover 8, including a water dispenser 6 of known design, is shown in FIG. 1, and is of sufficient size to enclose all of the cartridges. The cover preferably also includes a system status display 4, such as an LCD or array of LEDs, and air vents 154. Not shown in FIGS. 1 to 3 and 11 are the electrical connections, means to secure the cover on the flowboard, and the optional features of water heater means, water cooler means, and water conditioning means for introducing additives (such as fluorides) to the treated water.

The flowboard 12, as shown in FIGS. 2 to 5 and 11, is preferably a rectangular box like structure of metal or rigid plastics material preferably having a base 38, integral side walls 40, 42, 44, 46, and a removable top 48 defining a cavity 50 (see FIGS. 4, 5, and 11) for receiving therein a plurality of cartridge mounting assemblies 52 (see FIGS. 9 and 10) and conduits for connecting the respective mounting assemblies for cartridges 14, 16, 18, 20, 28, to each other and to the linear motion valves 30, 32, which control the direction of flow of water through the device in accordance with the desired operational mode. The flowboard, as best seen in FIG. 11, has a plurality of holes or recesses 54 and the cover 48 has a like number of profiled apertures 56 in the cover 48, each aperture aligned with a respective hole to simplify non-rotatable mounting of assemblies 52 in the flowboard 12.

Figure 3:
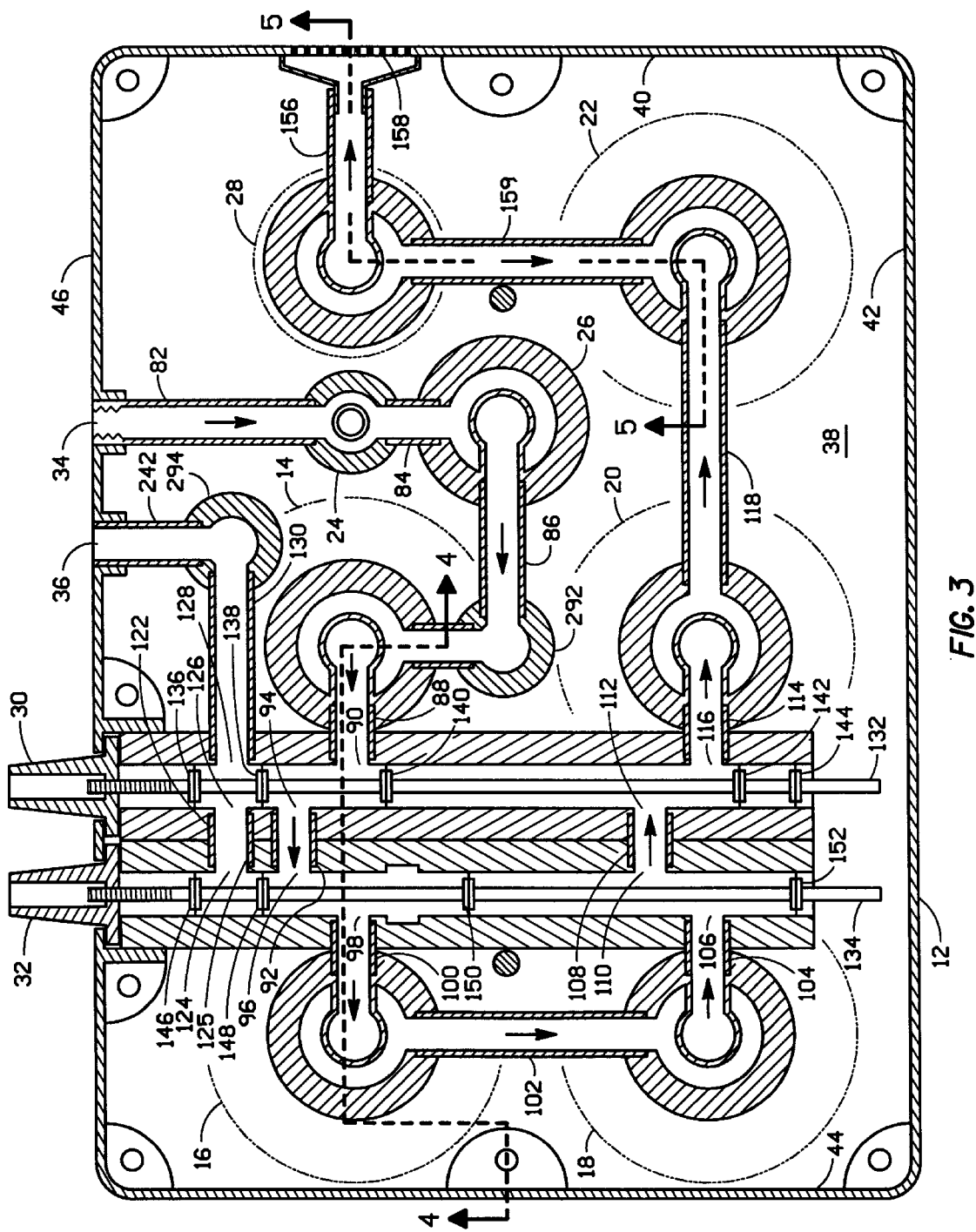
FIG. 3 is a top plan view of the flowboard of the present invention.
Figure 4:
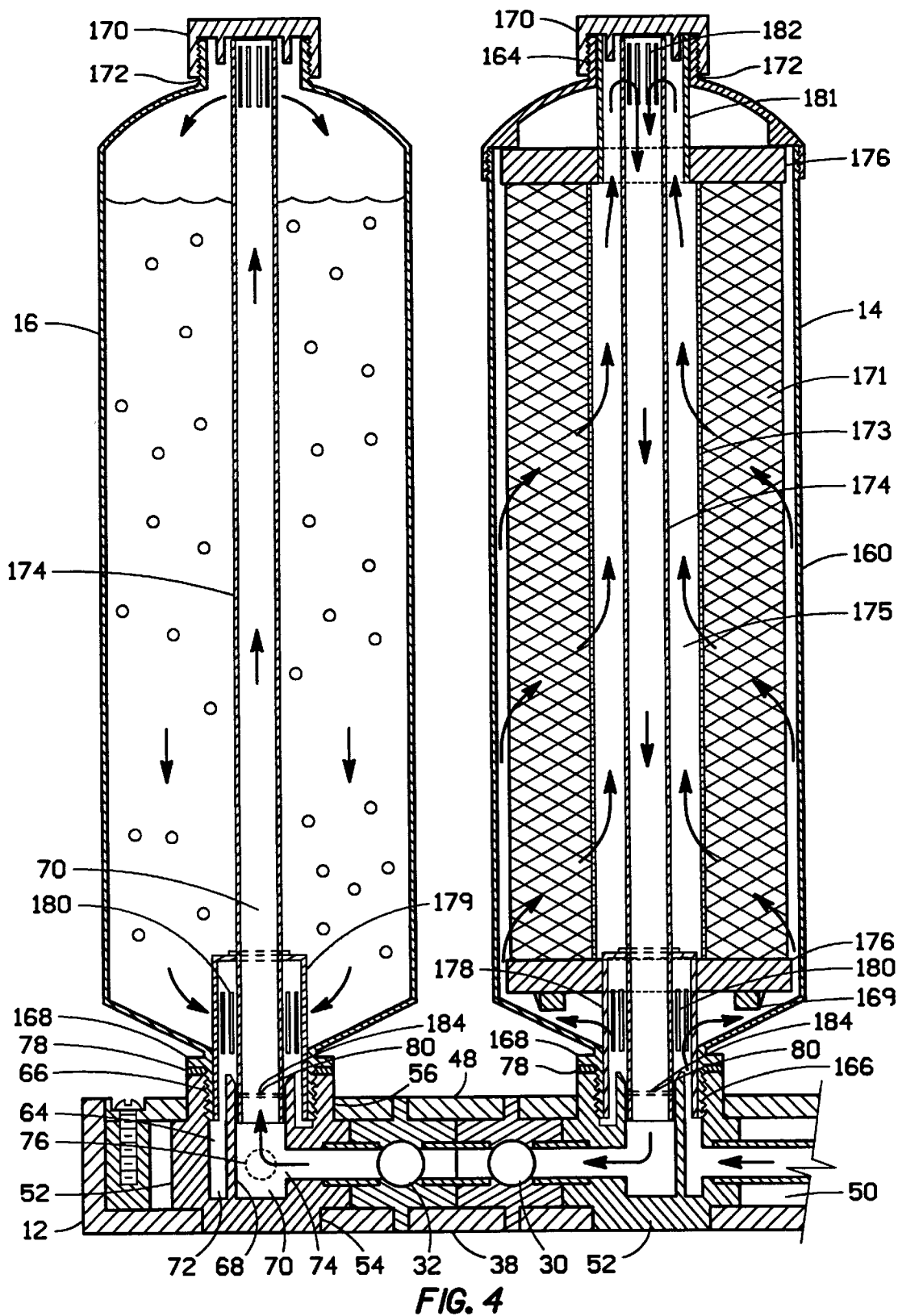
FIG. 4. is a vertical section through a portion of the flowboard of the present invention, taken along line 4—4 of FIG. 3, showing the mounting of a sediment filter and an activated charcoal cartridge.
Figure 5:
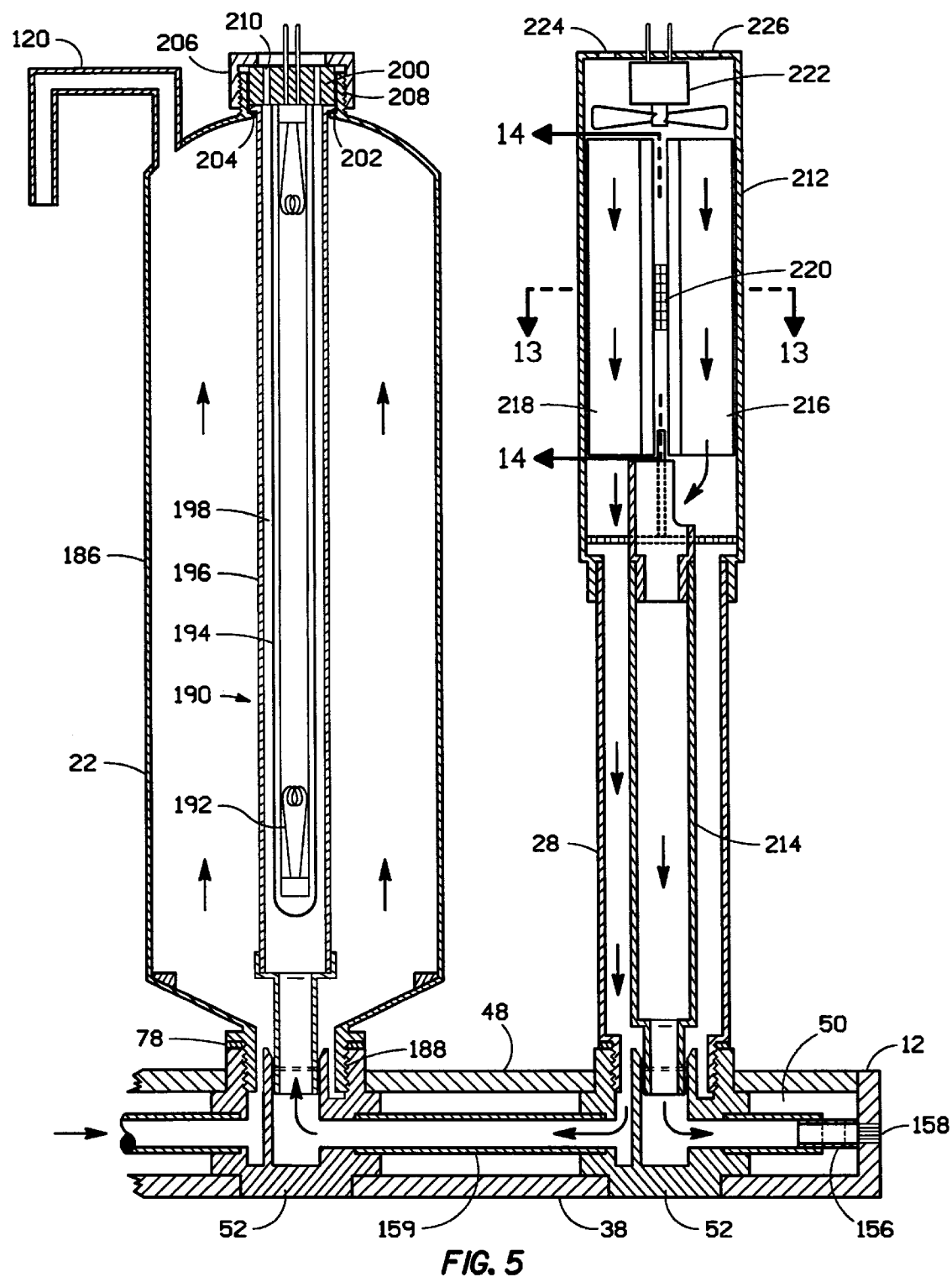
FIG. 5 is a vertical section through another portion of the flowboard of the present invention, taken along line 5—5 of FIG. 3, showing the mounting of the ultraviolet cartridge and the cool fan/thermo electric device assembly.

The flowboard 12 may be somewhat better appreciated from FIGS. 4 and 5 which show vertical sections through the flowboard 12 and the mounting assemblies 52 for the sediment filter cartridge 14 and the activated carbon filter cartridge 16 (FIG. 4), and the disinfection chamber cartridge 22 and cooling fan/thermo electric device assembly 28 (FIG. 5). The details of a typical cartridge mounting assembly 52, and its connections to the respective conduits so as to allow flow of water axially into and coaxially out of a cartridge received thereon, are shown in FIGS. 4, 5, 9 and 10. The mounting assemblies 52 for the various cartridges are referred to, in FIG. 3, by the cartridge associated therewith. Each mounting assembly 52 is a generally cylindrical member 58 having a profiled locking extension 60 depending from the bottom to be received in a respective hole 54 in base 38 and a profiled upper end 62 to extend through the profiled aperture 56 in cover 48. Both the locking extension 60 and the upper end 62 are profiled, in any known manner, with means (here shown as flanges received in respective recesses) to insure a non-rotating mounting of the cartridge mounting assemblies 52 in the flowboard 12. Each mounting assembly 52 further includes a cartridge, receiving socket 64 extending from the cover 48. The upper end of the socket 64 is shown with an internal thread 66, but any known quicklock connection, even a keyed or sized connection, could be provided to assure that only the correct cartridge will be inserted into the proper mounting assembly. A cylindrical member 68 is fixed to the bottom of the socket 64 and extends coaxially therefrom to define an inner cylindrical chamber 70 and an outer annular chamber 72. Ports 74, 76 are connected to the inner and outer chambers 70, 72, respectively, and each port can serve as an inlet or as an outlet, depending on the direction of fluid flow. All the mounting assemblies 52 are preferably the same, with the possible exception of the orientation o f the inlet/outlet ports 74, 76. Annular seal 78 is received on the flat upper end surface of the socket 64 to provide sealing between the mounting assembly 52 and the cartridge mounted thereon. An O ring 80, to be discussed below in connection with the description of the cartridges, provides further sealing between the cartridge and the inner cylindrical chamber 70 of the mounting assembly 52.

The flowboard 12 is designed to enclose all fittings and the conduits that connect the mounting assemblies. The flowboard 12 could be constructed from plastic or a light metal, such as aluminum, and could be molded or even machined as one piece. The mounting assemblies 52 are preferably manufactured or molded from FDA approved plastics and are assembled and sealed with O rings, cement, glue or heat. The flowboard 12 is designed to accommodate normal water supply pressure, but will preferably operate at relatively low or negligible pressure. A low pressure system will significantly reduce the cost of construction material and minimize the potential for leaks developing. The solenoid valve 24 provides isolation between high pressure supply line and the rest of the system.

Turning again to FIG. 3, the water inlet 34 is connected to the flow control solenoid 24 by conduit 82 and in turn to the mounting assembly for flow meter 26 by conduit 84. Conduit 86 connects the flow meter 26 to the inlet of the mounting assembly for the sediment filter 14, via a 90° fitting 292 (FIG. 12), and conduit 88 connects the mounting assembly for the sediment filter 14 to port 90 of linear valve 30. Conduit 92 connects the port 94 of linear valve 30 to port 96 of linear valve 32. Port 98 of linear valve 32 is connected by conduit 100 to the inlet of the mounting assembly for the activated charcoal cartridge 16. Conduit 102 connects the outlet of the mounting assembly for the activated charcoal cartridge 16 to the inlet of the mounting assembly for the ion exchange cartridge 18. The outlet of the mounting assembly for the ion exchange 18 is connected by conduit 104 to port 106 of linear valve 32. Conduit 108 connects port 110 of linear valve 32 to port 112 of linear valve 30. Conduit 114 connect port 116 of linear valve 30 to the inlet of the mounting assembly for the submicron filter 20 and conduit 118 connects the outlet of the mounting assembly for the submicron filter 20 to the inlet of the mounting assembly for the water disinfection chamber 22. Conduit 120 (see FIG. 5) provides an outlet for the water from the disinfection chamber 22. Linear valves 30, 32 are further interconnected by conduit 122 connecting ports 124, 126. Port 128 in valve 30 is connected to drain 36 port by conduit 130 via a 90° fitting 294. Each linear valve 30, 32 has an axially extending rod 132, 134, respectively, upon which are fixed a plurality of spaced sealing members 136, 138, 140, 142, 144, 146, 148, 150, 152. An air inlet 154 (see FIG. 1)forms an opening in the cover above the cooling air/thermoelectric device 28. Hot air is vented from this device through conduit 156 and through side port 158 (see FIG. 5). Cool air is circulated through the UV lamp secondary sleeve of the disinfection chamber 22 via conduit 159.

FIG. 4 is a vertical section through a sediment filter cartridge 14 and an activated carbon filter 16. Each cartridge 14, 16 is shown engaged in a previously described mounting assembly 52. Typically each filter cartridge used in the present invention has a rigid cylindrical housing 160 with outwardly threaded first (bottom) end 162 and a similar outwardly threaded second (top) end 164. The first end 162 is threadedly received in mounting assembly 52 until shoulder 168 engages the seal 78, while second end 164 receives thereon an internally threaded cap 170. The cap serves both for an opening to fill the cartridge with water treatment media and as a means to vent the cartridge for draining. The diameter of the cap would be determined by the filter media to be received therein, smaller if the cartridge is to be filled with a bulk water treatment media and full diameter for inserting a preformed filter cartridge. A cylindrical insert 174 can be positioned coaxially in the housing 160 to define an inner axial chamber. The insert consists of a small bore inner sleeve 173 that spans the length of the cartridge housing and loosely engages the cap 170. The lower insert section has an additional (coaxial short outer sleeve 179 that shrouds and engages a lower end portion of inner sleeve 173. Sleeves 173 and 179 are joined to form one piece insert with no fluid communication therebetween or therealong. The outer sleeve 179 is received in force fit sealing engagement into neck 178 of the housing 160. The inner sleeve 173 has an array of slots 180 at its upper end and the outer sleeve 179 has a similar plurality of elongated slots 182. The lower end of the sleeve 173 is received in the inner chamber 72 of the mounting assembly 52. An O ring seal 80 in mounted on the outside of the inner sleeve 173, which is preferably provided with an annular groove 184 to prevent dislocation of the O ring as the cartridge is mounted onto and dismounted from the mounting assembly 52. The end of the sleeve 173 is received in the inner chamber 72 of the mounting assembly 52 with the O ring seal 80 providing sealing therebetween.

Water conditioning media in the carbon and ion exchange cartridges 16 and 18, respectively, are preferably handled as bulk material and charged into their respective cartridge housings through cap 170. On the other hand, sediment filter 15 and sub micron filter 20 preferably are in the form of manufactured filtration elements of suitable pleated or wound fibrous filtration material that may be encapsulated for insertion into the housing. For the sake of simplicity and safe replacement of used filter media 171, which could contain microbial growth, it is preferable to have the filter media encapsulated in the housing. This facilitates replacement and disposal of the filtration cartridges when exhausted. Provisions are provided in this invention to accommodate conventional "off the shelf" filtration elements. To maintain an annular flow pattern around the filtration element, an plurality of mounting members 169 will be provided at the bottom and top of housing to retain the filter element in place without obstructing flow around and through the element. Furthermore, sleeve 179 will be force fit to engage the inner core of the element bottom rubber flange 176, while an insert 179 engages the inner core of the element at the top flange to maintain proper sealing. In case of filter cartridges 14 and 20, the flow of water has to pass out through slots 180 of sleeve 179, flow annularly up and radially through the media and its cylindrical perforated support core, annularly up through space 175, radially in through slots 182, and axially down through inner sleeve 174.

The activate carbon filter cartridge 16 is similar to the sediment filter cartridge, but the flow of water is reversed. The bulk water treatment media is placed into this cartridge through the cap 170. The normal water flow will enter through port 74 into the inner chamber to flow axially upwardly and flow annularly down through the filter media into outer chamber 74 and exit through port 76.

FIG. 5. is a vertical section through the ultraviolet disinfection cartridge 22 and the cooling fan/thermo electric device assembly 28. The mounting assemblies 52 for these cartridges are substantially identical to those described above and there for need not be described again. The housing 186 for the disinfection cartridge 22 is made from either stainless steel or hard glass coated on its external surface with a reflective material, such as polished aluminum foil, in a manner similar to thermos bottles. The threaded neck 188 is adapted to be received in the mounting assembly 52. An ultraviolet light producing means 190 is preferably formed by a single ended ultra violet lamp 192 mounted within a protective sleeve 194 which in turn is coaxially mounted within an outer quartz or hard glass sleeve 196 defining an annular air passage 198 therebetween. The ceramic mounting assembly 200 for the ultraviolet means 190 is received within cavity 202 against annular shoulder 204 and is held therein by internally threaded cap 206 which is received on external threads 208. The mounting assembly 200 includes air vents 210 communicating with annular air passage 198. Th water outlet conduit 120 is connected to the upper end of housing 186.

Preferably the subject system utilizes a low pressure mercury vapor germicidal lamp which emits radiated energy at 2537 angstrom (or about 254 Nanometer). This is the region of wave lengths most lethal to micro-organisms. These lamps are made of hard glass quartz or high silica glass for better transmittance. Maximum radiation intensity occuis when the lamp operates at 40° C., which normally can be reached within two minutes from turning the lamp on. Lower temperature operation results in less intensity. For personal safely and handling, each lamp is normally jacketed within a quartz sleeve.

A preheat, start hot cathode, single lamp with a ceramic base is preferred for use in this system. This lamp could operate constantly to insure continuous disinfecting, since ultraviolet energy has no residual effect in water. However, operating an ultraviolet lamp continuously will generate sufficient heat to increase water temperature, particularly over long time periods. Water could be subject to germicidal contamination if the disinfecting action of the ultraviolet lamp is interrupted for any substantial period of time, for example due to infrequent use of the unit. Alternatively, instant start lamps could be used to reduce the heat significantly, but these generally require an expensive, bulky ballast. The use of preheat start lamps has the advantage of using standard "off the shelf" fluorescent light ballast which is both small in size and economical to operate and maintain.

The subject system provides a second sleeve 196, of quartz or hard glass, to allow for annulus space 198 around the lamp's protective sleeve 194. A forced convection air draft, by means of a fan operating either independently or in conjunction with cooling fan/thermo electric device assembly 28, may be employed for flowing cool air in the annular passage 198 around the ultraviolet lamp thereby cooling for the lamp.

Public health service water standards require that the minimum dosage of 16,000 micro-watt-second per square centimeter must be applied at all points throughout the disinfection chamber. The disinfection chamber is sized to maintain residence time, based on output water flow (1 liter per minute), that meets or exceeds this criterion.

Figure 13:
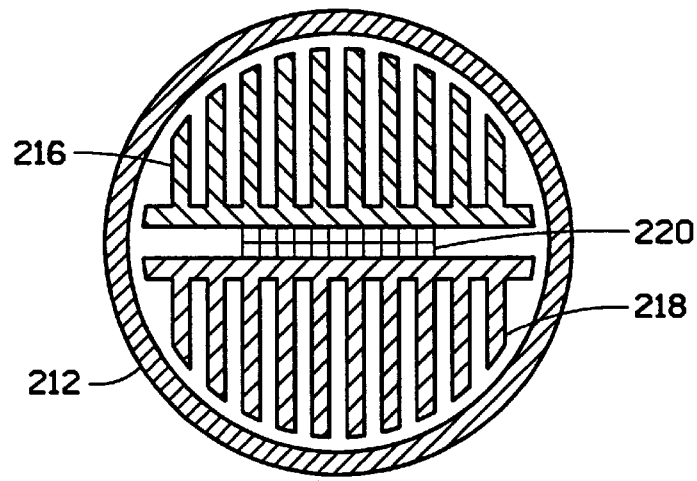
FIG. 13 is a section through the ultraviolet cooler convection block taken along line 13—13 of FIG. 5.
Figure 14:
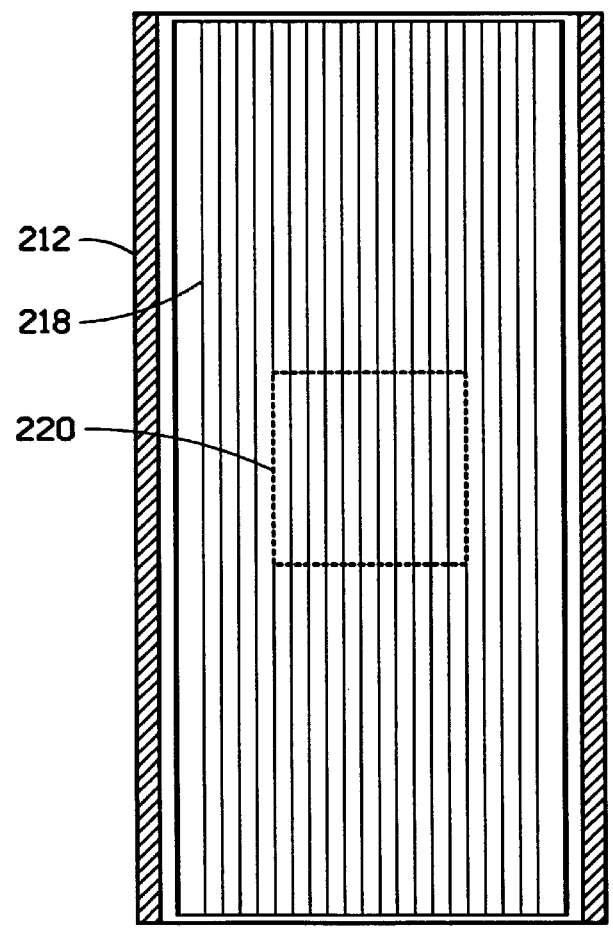
FIG. 14 is a section through the ultraviolet cooler convection block taken along line 14—14 of FIG. 5.

Turning to the cooling fan/thermo electric device assembly 28, shown on the right of FIG. 5, again the mounting assembly 52 is as described above. The assembly 28 includes an outer housing 212, a coaxial inner duct 214, a pair of thermoelectric hot and cold convection blocks 216, 218, a DC operated thermoelectric device 220, a fan assembly 222 and a cover 224 having a plurality of vent openings 226 therein. Ambient air is drawn in through vents 154 in the cover and through vents 226 by the fan assembly 222. The air is driven downwardly through the thermoelectric convection means 216, 218, 220 where the thermoelectric convection means causes cooling of the annular outer curtain of the air while an axial inner air flow is heated. The hot air passes through conduit 156 to be expelled from vent 158. Cooled air passes through conduit 159 to the disinfection chamber 22, previously described, where it maintains the temperature of the annular space around the ultraviolet lamp. FIG. 13 is a section taken along line 13—13 of FIG. 5 and FIG. 14 is a section taken along line 14—14 of FIG. 5 showing the heat convection blocks 216, 218 and thermoelectric device 220. Conventional; features of the thermoelectric device 220, such as insulation, have been omitted for clarity of the drawings.

The thermoelectric device 220 is based on the Peltier effect. When a direct current flows through a circuit comprised of difference conductors (dissimilar materials) one junction between the materials is cooled while the other is heated, depending on the direction of current flow. Thus the device acts in much the same manner as a heat pump.

In normal operation, as shown in FIG. 3, water enters inlet 34 when solenoid 24 is actuated. The water flows through conduit 82, solenoid valve 24, conduit 84, flow meter 26 and conduit 86 to the coaxial inlet of the sediment filter 14. The water exits the sediment filter 14 axially and passes to the activated charcoal filter cartridge 16 via conduit 88, port 90, valve 30, port 94, conduit 92, port 96, valve 32, port 98 and conduit 100. Flow in the sediment filter 14 is upward and external to filter media to displace air in the media. The flow in the ion exchange and activated charcoal cartridges is downward to prevent any bed disturbance (more efficient). Again the water flows axially into the activated charcoal filter cartridge 16 and exits coaxially to pass through conduit 102 where it follows the same flow pattern through the ion exchange cartridge 18. The outlet of the ion exchange cartridge 18 is connected to the inlet of the submicron filter 20 via conduit 104, port 106, valve 32, port 110, conduit 108, port 112, linear valve 30, port 116 and conduit 114. After passing through submicron filter cartridge 20, which is of similar design and flow pattern to sediment filter 14, but with a finer (submicron) mesh size, the water flows through conduit 118 to pass annularly upwardly through the water disinfection chamber 22. Cooling air for the disinfection chamber 22 is provided by the cooling fan/thermo electric device assembly 28 to pass annularly around the ultra violet lamp assembly of the disinfection chamber to prevent the over heating there of The spent cooling air is exhausted through vent means 210 in the ceramic mounting assembly 200 of the ultra violet lamp. Thereafter, the air flows through a vent means 154 in the unit housing (FIG. 1).

In the start up, flush or purge mode, the linear valve 30 would be manually rotated to move all the sealing elements 136, 138, 140, 142, and 144 simultaneously outwardly (upwardly as shown in FIG. 3), isolating the filter 20, so that now water enters inlet 34, flows through conduit 82, solenoid valve 24, conduit 84, flow meter 26, conduit 86, through the sediment filter 14, conduit 88 and port 90 to linear valve 30. Here the water path changes, reverses in direction and it flows through valve 30 to port 112, conduit 108, port 110 to linear valve 32, port 106, conduit 104 back through the ion exchange cartridge 18 in a coaxial upward or back flow mode, conduit 102, the activated charcoal filter cartridge 16 in an upward coaxial or back flow mode, conduit 100, port 98, linear valve 32, port 96, conduit 92, port 94 of linear valve 30 through port 128 to the drain 36 via conduit 130, 90° fitting 294 and conduit 242. Seals 136, 144, 146 and 152 serve to prevent water leakage through the ends of the linear valves 30, 32, respectively. Valve 32 is used for draining the system. It is manually rotated to move the sealing elements 146, 148, 150 and 152 outwardly (upwardly in FIG. 3) opening port 126 to conduit 125 allowing fluid to drain from the system through port 126, valve 30, port 128, conduit 130, and drain port 36.

Figure 6:
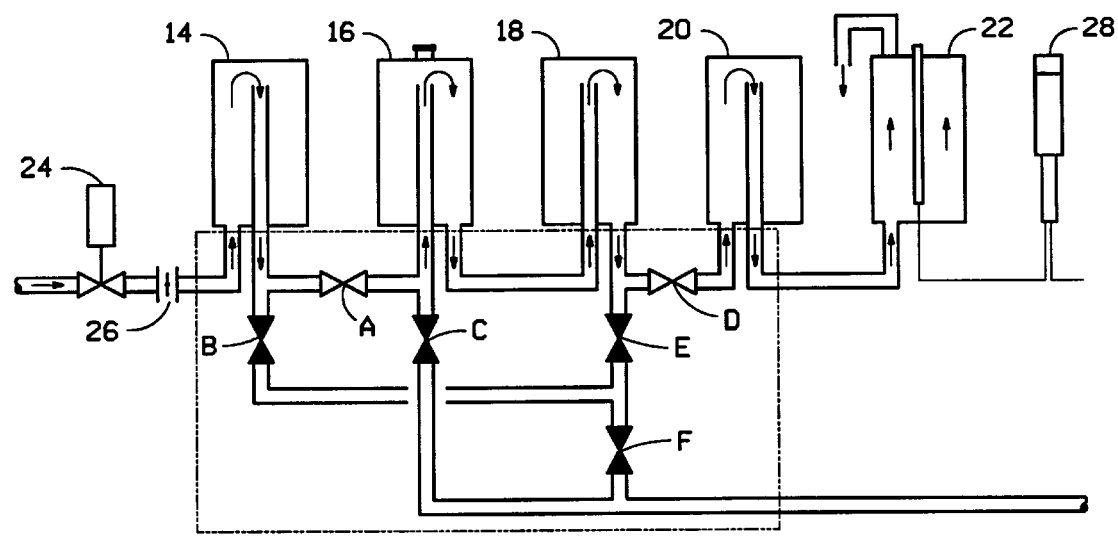
FIGS. 6 to 8 are diagrammatic views of the present invention showing, respectively, the flow path through the system in the normal service mode; in the start up, flush and purge modes; and in a drainage mode in preparation for cartridge replacement.

FIG. 6 is a diagrammatic side elevation of the present invention showing, by means of arrows, the flow path through the system in the normal service mode. Flow through the ion exchange and carbon beds is downward through the respective beds for higher efficiency. The segments of linear valves 30 and 32 have been shown as individual valves A to F for ease of understanding the operation of the present invention. As shown in FIG. 6, valves B, C, E and F would be closed. Flow is through valve 24, flow meter 26, sediment filter 14, open valve A, activated charcoal filter 16, ion exchange 18, open valve E, submicron filter 20, ultraviolet sterilizer 22, and out through the outlet.

Figure 7:
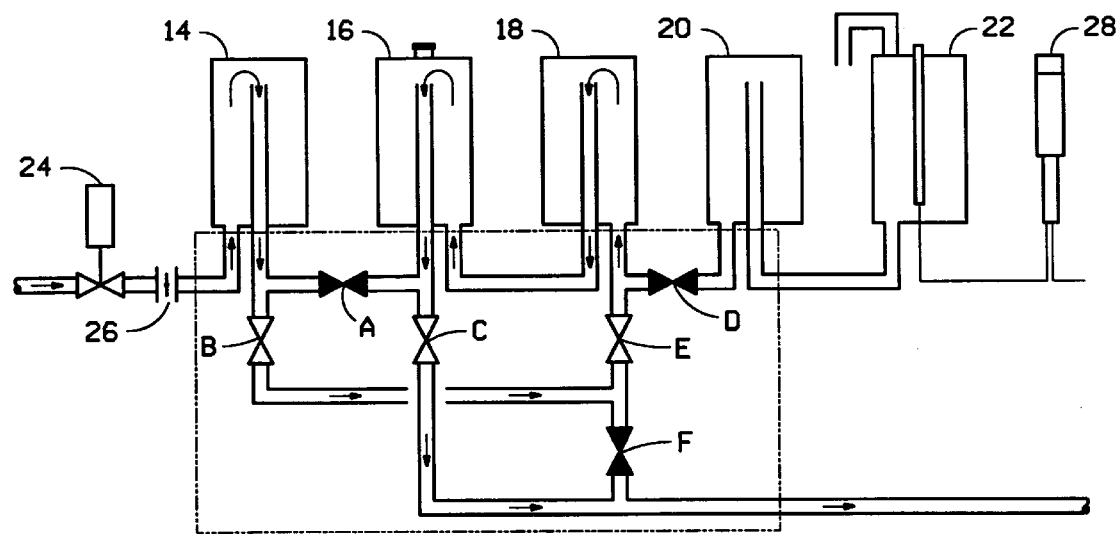

FIG. 7 is a similar diagrammatic side elevation of the present invention showing, by means of arrows, the flow path through the system in the start up, flush and purge modes. In order to operate the system in normal mode, all ion exchanger and activated charcoal cartridges must be vented to allow the release of trapped air. Presence of air in these cartridges will significantly prevent proper contact and thereby reduce the efficiency of the exchangers and filters. In addition, new cartridges could contain broken particles and/or charcoal dust that could accumulate on the last filter and completely plug it. Therefore the system provides for the flushing and purging of these cartridges upon system startup. In this instance, valves A, D and F are closed. Flow is in from the inlet through solenoid valve 24, flow meter 26, sediment filter 14, open valve B, open valve E, backflow through ion exchange 18, back flow through activated charcoal filter 16, through open valve C to drain 36. This mode would be used to clean the system of any impurities which may have been introduced during assembly and/or transport of the system.

Figure 8:
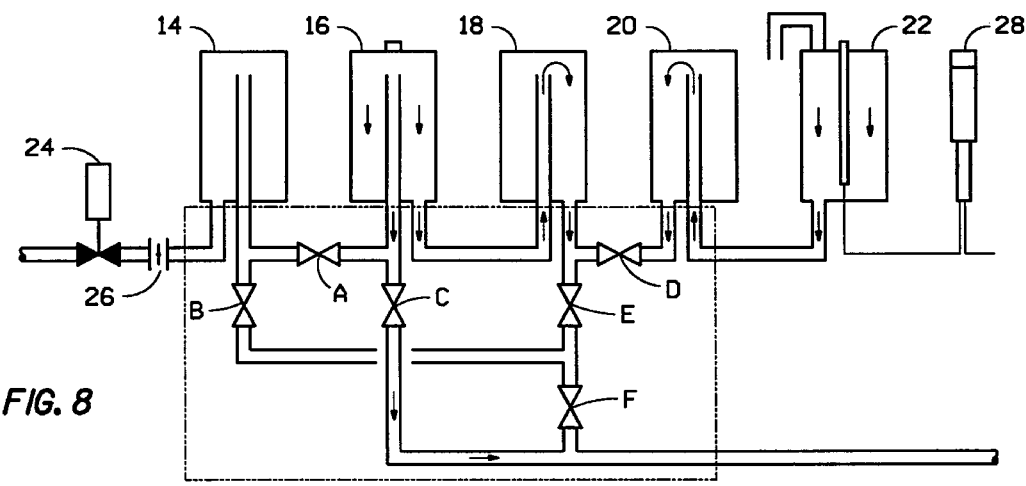

FIG. 8 is a similar side elevation of the present invention showing by means of arrows, the flow path through the system for a drainage mode in preparation for cartridge replacement or removal of the subject system to a new location. In this instance all valves but the solenoid valve are open. Air is admitted to the system through the open tap (not shown) and an open cap for activated charcoal filter 16. Water drains, by syphoning, from ultra violet sterilizer 22, submicron filter 20, through valves D, E and F to drain 36. Water in activated charcoal filter 16 drains through open valve C to drain 36 and through ion exchange 16 though open valves E and F to drain 36. Sediment filter 14 is a coaxial upward flow cartridge. Admitting air will only empty the axial tube, but not the annular space. Syphoning will not occur if air is not admitted. The cartridge could be removed with only minor dripping.

Figure 15:
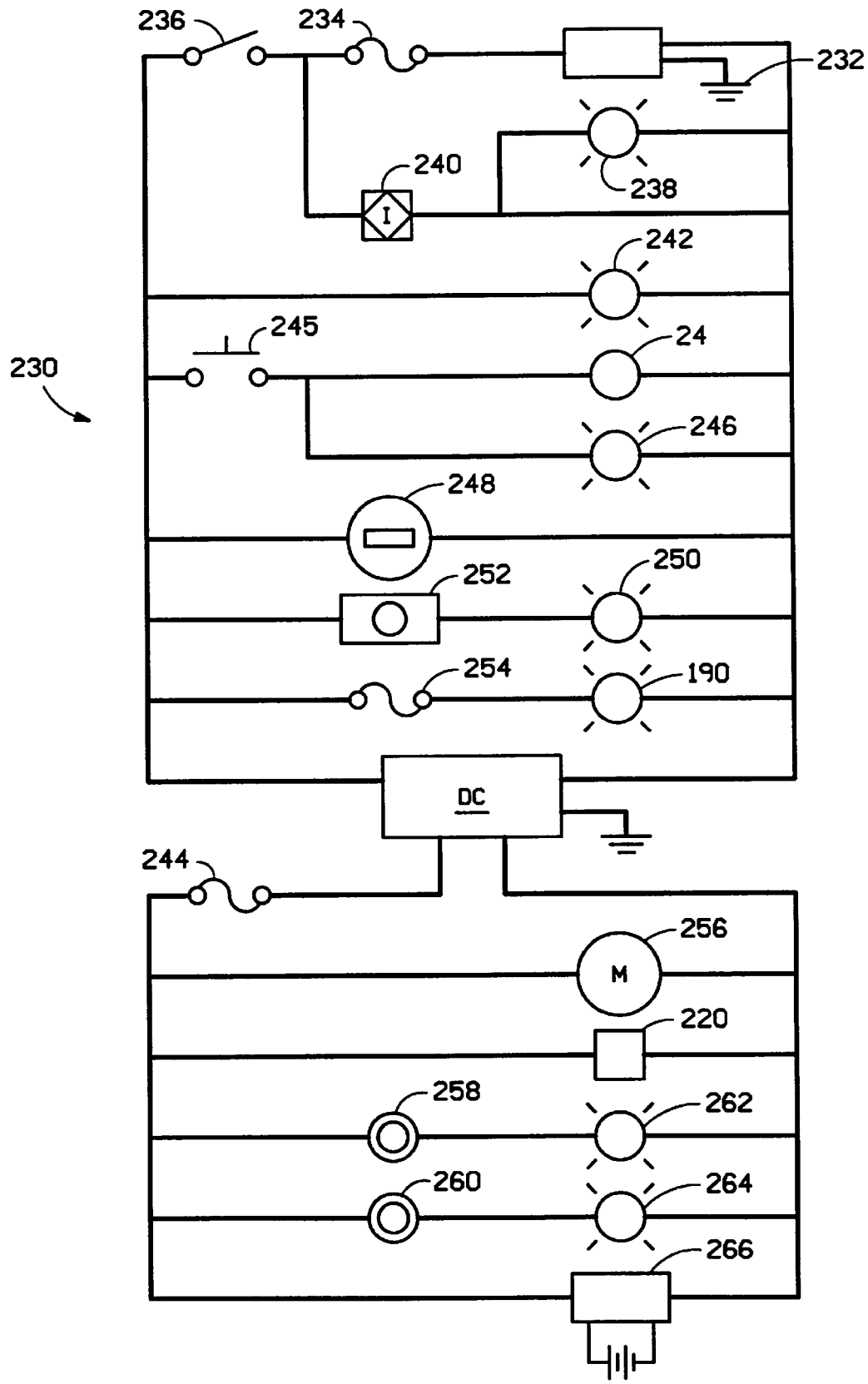
FIG. 15 is an electrical schematic for the subject invention.

FIG. 15 is an electrical schematic for the subject invention. The electrical circuit 230 must be grounded 232, in order to prevent any accidental shorting with the water. The circuit 230 includes an AC power source fuse 234, DC power source fuse 244, power switch 236 and power on indicator light 242. Preferably the cover is fastened to the flow board by electric interlock means 240, in addition to a mechanical lock, to prevent accidents should the cover be opened while the electrical power to the unit is on, housing closed light 238 indicating the status of the interlock 240. The system can be charged with water by closing switch 244 to activate a solenoid valve 24 and energize a corresponding status light 246. Optionally the system can include an elapsed time meter 248 and a night light 250 activated by a photo cell 252. The ultraviolet lamp assembly 190 is connected to the circuit through fuse 244. Fan motor 256, thermoelectric means 220, discrete water quality measuring means 258, 260 and indicator lamps 262, 264 and an operational clock 266 or flow meter are also connected to the circuit. The circuit could also include pressure sensing means (not shown) to indicate any stoppage in the water flow. The circuit could further include a continuous conductivity meter and control to indicate concentration of dissolved solids and shut down the unit if these solids exceed a preset limit.

The purity of demineralized water is measured by the specific electrical resistance of the water, measured in ohms, to an electric current. Electric current has less resistance in the presence of high concentrations of electrolytes (dissolved ionized solids) than in low concentration solutions. Water with a specific resistance of 100,000 ohms-cm has an equivalent Total Dissolved Solids (TDS) of 2–3 ppm. Such water is considered "pure" and could be produced by a two-bed ion exchanger. Water with a specific resistance of 1,000,000 ohms-cm (1 Meg ohm-cm) has an equivalent TDS of 0.2–1.0 ppm. Such water is considered "very pure" and could be produced by a four-bed ion exchanger (two two-bed ion exchangers in series). A mixed bed ion exchanger is capable of producing water with a specific resistance of 2,000,000 ohms-cm (equivalent to 0.2–0.5 ppm TDS). A two-bed ion exchanger in series with a mixed bed is capable of producing water with a specific resistance of 10,000,000 ohms-cm (equivalent to 0.04–0.1 ppm TDS). This water is considered to be "ultrapure." The highest water purity that is practically achievable would have a specific resistance of 18,300,000 ohms-cm (18.3 Meg ohms-cm).

The invention of the mixed ion bed in the early 1950's (see U.S. Pat. Nos. 2,578,937 and 2,692,244) had a dramatic effect in the art of water purification. Mixed bed ion exchangers can produce ultrapure water, defined above as water with a specific electric resistance of 18 Meg ohms-cm (18,000,000 ohms-cm). However, mixed bed ion exchangers are less efficient than single ion bed exchangers and the mixed ion bed can be quickly exhausted. There for, conventional two bed ion exchangers, or reverse osmosis membranes, are usually used for a pre-treatment of the water fed to the mixed bed ion exchange.

The cascade ion exchange of the present invention is intended to produce water of high purity quality, as previously defined. The typical ion exchanger, discussed above, contains two ion resin beds, each bed having only one type of ionic resin, either a cation or an anion, in what is known as a two-bed system. Another class of ion exchanger is known as a mixed bed system and contains a mixture of both cation and anion resins in a single bed. The resin particles, being intermingled next to each other, constitute a plurality of two-beds. Just as a four-bed system would be expected to produce water which is more pure than a two-bed system, the mixed bed system produces water which is more pure than either the two or the four bed systems, but the mixed bed has some deficiencies. In order to regenerate a mixed bed ion exchange system, the cation and anion resin particles must be separated (based on their density) into two distinct layers. However, regeneration of a mixed bed system is always less efficient than with other types of bed systems due to the inability to completely segregate reagents at the interfaces between the two resin layers.

The subject cascade ion exchanger overcomes the difficulties of the prior art by providing a plurality of alternating ion segments, compartments, chambers or units. The cascade ion exchange cartridge consists of a series of alternating cation ion resin exchanger chambers and anion ion resin exchanger chambers within a single cartridge. The subject invention provides a unique arrangement wherein, in a normal operational mode, water flows in cascading order sequentially downwardly through all segments. In a backflow or regeneration mode, the wash flows sequentially upwardly only through like cation or anion chambers. The embodiment of the subject invention can be varied with any number of pairs of chambers, for any given application. The required amounts of cation resin and anion resins are housed in relatively small quantities, preferably in shallow layers, in a cascading series of alternating beds, cation followed by anion followed by cation and so on. Thus a series of six to twelve beds can contain an amount of resin equivalent to that of a large two-bed system without having a significant increase in overall size while providing a significant increase in the purity of the water produced and the capacity of the exchange resins.

For small capacity cascade systems, less than 10 gpm, fiber glass vessels or vessels made of light durable composite material could be used. Cascade ion exchange for demand quantities less than 50 gpm can be provided by having multiple alternating short columns of cation and anion beds. These short columns, essentially a plurality of series connected individual chambers, preferably are detachably mounted on a manifold which provides for series flow sequentially through each vessel, in a normal mode, and through alternating pairs of vessels in a backflow or regeneration mode.

Previously, the efficiency of in-situ regeneration of mixed beds depended on the proper separation of the lighter anion resin from the heavier cation resin into two distinct layers. This was usually accomplished when the resin bed was fluidized in the countercurrent backwash cycle and was only achieved if the specific gravity of the anion resin was significantly lower than that of the cation resin. Otherwise, proper separation would not take place. However, this is not a problem with the present invention since the cation and anion resins are kept separate at all times and can be individually treated during regeneration.

In the subject cascade ion exchange system, cation and anion resins are placed in segregated layers or compartments and thus provide the following advantages. The cascade ion exchange system allows the use of any ion exchange resins or combination of resins, regardless of specific gravity or physical property of the resins. The subject cascade ion exchange system allows simultaneous use of different types of resins, such as the use of strong and weak acid cation resins and strong and weak base anion resins in the same cascade system.

A study was conducted to determine the effectiveness of the subject cascade system as compared to a conventional two-bed system, each having substantially equal total resin heights (resin volumes). The experiments used Rohm & Haas Amberlite IR-120 plus Strong Acid Cation Resin and Amberlite IRA-410 Strong Base Anion Resin. The resin was configured in two bed units (Cation and the Anion resins) and the subject cascade of alternating compartments of Cation and Anion resins. The total Cation bed height was 30 inches. The total Anion bed height was based on resin ionic equivalency, or about 46 inches for this type of resin. One inch inside diameter borosilicate glass tubing, cut to different lengths, was used to form the compartments and columns. ACS Reagent Grade sodium hydroxide, sulfuric acid and sodium chloride chemicals were used throughout the experiment for resin testing, and resin regeneration. A Barnstead Resistivity Meter, with an accuracy to 0.2 megohm, was used for all the tests. Deionized water with resistivity greater than 18 megohms was used to piepare the test solutions and for all other rise and washing requirements.

Test apparatuses were produced for a two bed and the subject cascade system. The conventional two-bed ion exchange system was represented by a one inch diameter tube which was filled with 30 inches of strong acid cation exchange resin followed by a similar one inch diameter tube filled with 46 inches of strong base anion exchange resin. The cascading ion exchange apparatus was represented by alternating one inch diameter tubes of cation ion exchange resin with one inch diameter tubes of anion exchange resin to form six pairs. Each cation ion exchange resin of the cascade system was five inches long, for a total cation column length of 30 inches, and each anion exchange resin bed was 7.75 inches long, for a total anion ion exchange column length of 46 inches. The first cation exchange resin bed was connected to a peristaltic pump. The last anion exchange resin was connected to a resistivity meter. The flow through resin beds was down flow, from top to bottom.

Before packing the glassware apparatus with resin, the resin of both types were regenerated and rinsed. The IRA-410 anion exchange resin was treated with 4% sodium hydroxide solution in deionized water at a rate of 0.5 gallons per minute and regeneration level of about four pounds of 100% sodium hydroxide per cu.ft. of resin. Similarly, the IR-120 cation exchange resin was treated with 2.5% sulfuric acid at a rate of 1.0 gallons per minute and regeneration level of about five pounds of 100% sulfuric acid per. cu. ft. of resin. Thereafter, reagents were flushed and both types of resin were rinsed after regeneration with 0.5 gallons per minute of deionized water for five minutes.

Figure 18:
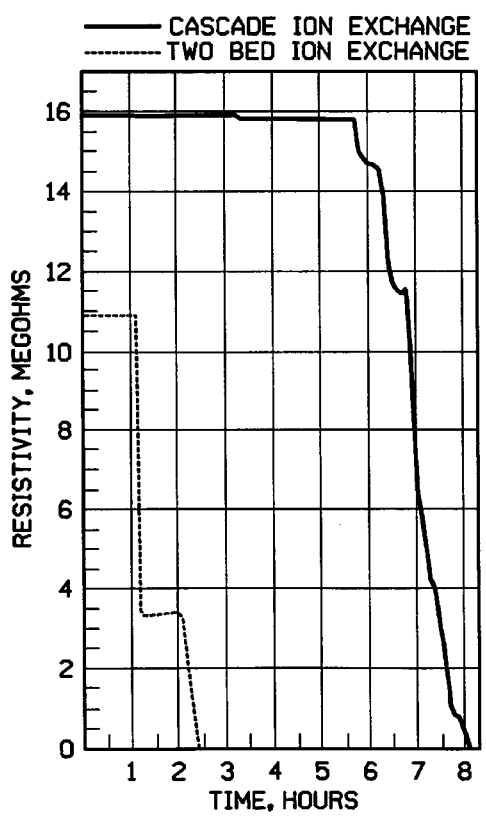
FIG. 18 is a plot of experimental data, using tap water, comparing a two-bed system with the subject cascade system at 2 gpm.
Figure 19:
FIG. 19 is a plot of experimental data, using tap water, comparing a two-bed system with the subject cascade system at 4 gpm.

In the test cases noted by the graphs of FIGS. 18 and 19, the subject cascade ion exchange system showed its superiority to the conventional two-bed ion exchange system. FIG. 18 is a comparison of the subject cascade system and a two-bed system using tap water at a rate of 2 gpm per cubic foot of resin. FIG. 19 is a comparison of the subject cascade system and a two-bed system using tap water at a rate of 4 gpm per cubic foot of resin.

A number of test runs were performed to evaluate the effect of water composition and water flow on cation and anion ion exchange resin performance arranged as conventional two bed and cascading (alternating) ion exchange resin systems. The tap water contained 450 mg/I total dissolved solids, with a typical analysis in milligrams per liter measured as follows:

| Sodium | 53 | Chloride | 100 |
|---|---|---|---|
| Calcium | 323 | Carbonate | 230 |
| Potassium | 46 | Sulfate | 120 |
| Magnesium | 19 | Fluoride | 2 |

Two flow rates of two and four gallons per minuter per cubic fool: or resin were used. These flow rates equated to 102 and 204 milliliters per minute or five and ten gallons per square foot of bed cross section per minute. Two gallons per minute per cubic foot is the norm in industrial resin application. The cascade ion exchange system achieved water purity of up to four times higher than the conventional two bed systems. Resin capacity was evaluated to be the time span that water purity is maintained at its highest level. In other experimental work, the cascade system had a capacity of up to five times that of a two-bed system.

For the tap water trials, the purity of the produced water exceeded 10 megohm. At the rate of 2 gpm/cu.ft. of resin, purity was as high as 16 megohm. For tap vater, with total dissolved solids of 450 mg/l and at flow rate of 2 gpm/cu. ft., the cascade ion exchange system purity was about 50% higher than the two bed system. The capacity of the cascade ion exchange was unexpectedly five times higher than the two bed system. Four, six and eight cascaded pairs of ion exchange beds were configured. The lower number of bed pairs resulted in purity and capacity closer to the conventional two resin bed system.

Figure 16:
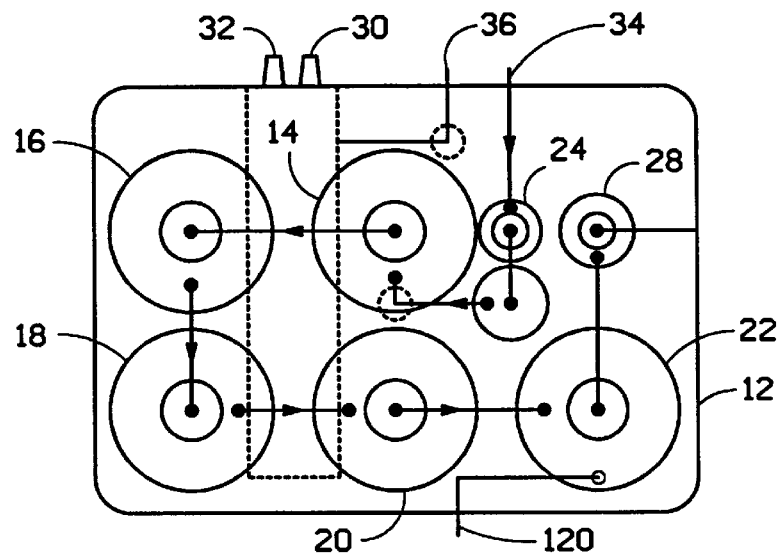
FIG. 16 is a schematic plan view of the above discussed embodiment of the subject flowboard.

The present invention, as schematically represented in FIG. 16, can be readily modified into a wide variety of embodiments in accordance with any special need. The alternate embodiment schematically illustrated in FIG. 17 would be a high purity water conditioning system for household and includes a cascade ion exchange system of alternating cation 284 and anion 286 cartridges capable of producing approximately 100 to 200 gallons of purified water, depending on the amount of dissolved solids in the supply water, before requiring maintenance. Such a system would able to compete economically with bottled water. The cation and anion cartridges could be replaced individually or as a pack 282 of eight cation and anion cartridges.

Another embodiment might include reverse osmosis water purification suitable for both home and office. A larger embodiment might be suitable for public facilities, such as malls and shopping centers while special embodiments could be made portable and intended for travel and/or even camping or survival use. These latter embodiments would preferably be battery powered. Any of these embodiments could be provided with water temperature control means including either or both water cooling and water heating means.

All home and office water embodiments preferably are of such dimensions as to fall into a counter top classification requiring little installation preparation. The illustrated embodiment, for example, would simply require attachment to a water supply, to a water drain, and electrical power. The unit could, if necessary, be installed in a cabinet or under a counter. However, it is preferable to keep the unit visible to the user since this would attract the user's curiosity to observe and monitor system operation. This will lead to frequent use of the system and the reliance on it as the primary means for water supply.

The water treatment applications considered and discussed should in no way be considered as a limitation on the scope of the present invention. The embodiment described is for purifying water with basic water conditioning and ion exchange. Some of the operational components are known, such as the filters and ultraviolet disinfection module. For a basic water conditioning system, a low micron rating (10 micron) sediment filter cartridge can be used as a pretreatment filter. This preferably is followed by an organic adsorption cartridge consisting mainly of high capacity granular activated charcoal. The charcoal could be blended with activated aluminum or weak acid cation for removing lead and other heavy metals from the water. The charcoal adsorption cartridge is preferably followed by an ion exchange cartridge, for example one containing strong base anion resin selected for nitrate removal. A sub micronfilter (0.2 micron) follows the nitrate resin as a post treatment filter. The filter is intended to remove pyrogen and bacteria. An ultraviolet disinfection element is the final water treatment. It should be noted that this is only a suggested arrangement of cartridges arid is not mandated by the present invention. Other arrangements of the cartridges could be used, especially to accommodate for local water conditions. Also, as previously mentioned, cartridges could be provided to add corrective chemicals, or even dispense medications, to the water to arrive at the finally desired chemical composition. For example, and as previously mentioned, fluoride could be added to or removed from the water. Should a natural occurrence, such as a hurricane, temporarily interrupt or affect the water supply, then appropriate cartridges could be added to the system to achieve the desired correction.

It is recommended that, for residential applications, regeneration of the ion exchange cartridges not be performed by the users who may well not be properly trained in the handling of chemicals. Exhausted ion exchange cartridges (packs or individual cartridges) could be sent for regeneration in dedicated facilities or disposed of to be replaced by fresh cartridges for a small service fee. For some export markets, an integral regeneration module could be provided for regeneration of the cascade ion exchange system by the users. In this case, a specially packaged supply of diluted acid and caustic would be provided in a specially designed disposable container.

Figure 17:
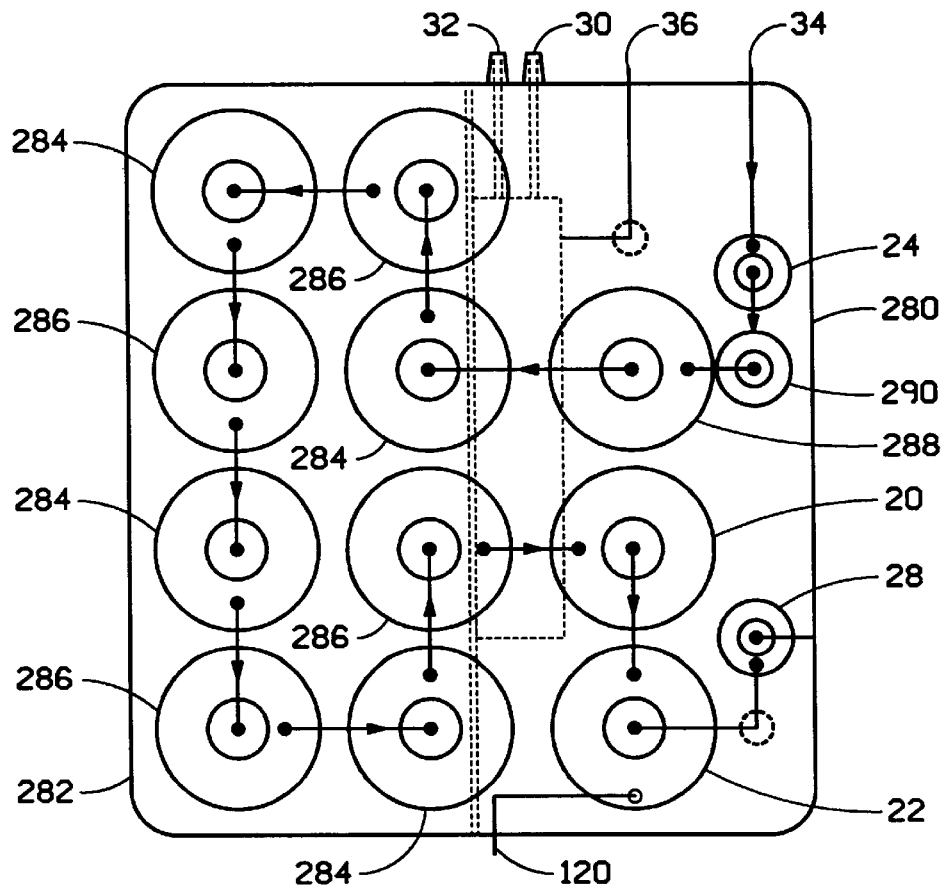
FIG. 17 is a schematic plan view of an alternate embodiment of the subject flowboard incorporating a cascade unit in a replacement pack.

The cascade ion exchange system (FIG. 17) preferably will have a designed capacity of treating 100–200 gallons of local water. It will require regeneration of the ion exchange system pack 282 as the resin is exhausted. The demand for large activated charcoal is less stringent since the anion resin also has affinity for organic matter. Therefore, one filter element containing activated charcoal 288 is used. In all applications, the normal flow pattern is downward. This pattern maintains packed particles which insure flow uniformly throughout the bed. Counter flow regeneration (upward flow in this case) is preferred. Purging the cascade system, FIG. 17, is similar to that of the basic system of FIG. 16 using a linear valve 30, 32. The cascade system is intended to produce high purity water. To avoid contamination of the ion exchange resin during purging, a small mixed bed cartridge 290 is used during start up to purify the purge water.

An additional advantage of the present invention is its flexibility. The flow board can be readily expended to accommodate additional cartridges customizing the treatment process for a particular local water condition. The flow board could be modified to allow for the addition of a thermoelectric water cooler and/or an electric hot water heater. The subject system can be provided with many options, such as, electric locks so that the housing cannot be opened unless the power is off Removal of the cover, to replace parts or cartridges, will deenergize all electrically operated flow board mounted elements, such as the solenoid valve, the ultraviolet lamp, the fan and thermoelectric elements. The system can have various alarms and lights, such as a night light which comes on in response to darkness. A lapsed time clock and a flow monitor are other options.

The system preferably operates off 110v AC power, and direct current power for the thermoelectric element. However, this does not prevent producing a battery powered embodiment.

It will be readily appreciated from the foregoing discussion that the present invention is readily adaptable for all types of water treatment. In addition to, or in place of some or all of the filter cartridges, cartridges containing material, such as chlorine and/or fluoride, can be introduced to the system. Water flowing through these cartridges would dissolve the material contained therein thereby effectively adding it to the water being consumed.

The present invention may be subject to many modifications and changes without departing from the spirit or essential characteristics thereof. The above described embodiments should there for be considered in all respects as being illustrative and not restrictive of the scope of the present invention as defined by the appended claims.

I claim:

1. A method for treating water containing impurities and purifying said water by removing said impurities at a residential counter top point-of-use, comprising:

providing a plurality of water treatment modules, each said module being a readily replaceable bottle like closed vessel having both its inlet and outlet concentrically formed in a single end and substantially filled with bulk material to remove a specific impurity in the water to be purified, said modules being received in a flowboard containing module mounting means interconnected within the flowboard with conduits and valves to provide a series flow through the modules; and directing a stream of water sequentially through said modules where the water will be treated and said impurities therein removed.

2. The method according to claim 1 wherein said impurities are non-ionic and undissolved impurities.

3. The method according to claim 1 wherein said impurities are ionic and dissolved impurities.

4. The method according to claim 1 wherein said impurities are gaseous impurities.

5. The method according to claim 1 wherein said impurities are biological impurities.

6. The method according to claim 1 further comprising:
providing thermo-electric means and the step of controlling water temperature with said thermo-electric means.

7. The method according to claim 6 wherein said water temperature is raised.

8. The method according to claim 6 wherein said water temperature is lowered.

9. The method according to claim 1 further comprising:
providing means for measuring water flow and the step of measuring the water flow.

10. The method according toe claim 1 further comprising:
chemically conditioning the water by the addition of soluble nutrients for taste and flavor improvement of the water.

11. A system for treatment of water containing impurities in a domestic point-of-use counter top environment for the purposes of removing said impurities and providing substantially pure and potable water suitable for human consumption, comprising:

a flowboard having a substantially rectangular housing with a plurality of cartridge receptacles and conduit means therein, said conduit means connecting said cartridge receptacles forming a series flow circuit between an inlet and an outlet of said flowboard;

valve means mounted in said flowboard and connected in said flow circuit to control the direction of flow therethrough; and a plurality of water treatment cartridges each being a bottle like vessel having coaxial inlets and outlets at one end thereof and received in a respective receptacle by said one end, at least some of said cartridges being substantially filled with bulk material to remove a specific impurity in the water to be purified, whereby water passing through said system is sequentially treated by passing into and out of the respective cartridges while being treated for removal of substantially all of the impurities contained therein.

12. A system according to claim 11 wherein each cartridge received in a respective receptacle removes at least one impurity from water passing into and out of said cartridge.

13. A system according to claim 11 wherein at least one cartridge received in said receptacles dispenses an additive into said water.

14. A system according to claim 11 wherein at least one of said cartridges exposes water passing therethrough to radiation.

15. A system according to claim 11 wherein at least some of said receptacles are arranged in pairs to form a series of deionization resin beds, each said bed being substantially filled with ion exchange resin alternating between cation and anion resins in adjacent beds of said pairs of receptacles, said water flowing through said beds in cascading series to produce high purity water.

16. A domestic counter to apparatus for the treatment of water at the point-of-use to remove substantially all of the impurities therefrom, said apparatus comprising:

a flowboard having a substantially rectangular housing defining a closed cavity therein containing a plurality of cartridge mounting assemblies exposed from one surface thereof, conduit means within said flow board connecting said cartridge mounting assemblies forming a flow path from a flowboard inlet to a flowboard outlet, and valve means connected in said flow path controlling the direction of flow through said apparatus;

a like plurality of water treatment cartridges, each said cartridge being a bottle like vessel having both an inlet and an outlet concentrically formed at a single end of said cartridge and which end is adapted to be removable received vertically in a respective one of said mounting assemblies, each said cartridge containing therein means to treat water to remove a specific impurity found in untreated water.

17. The apparatus according to claim 16 wherein said means for treating the water comprises means for removing impurities which are non-ionic and undissolved impurities.

18. The apparatus according to claim 16 wherein said means for treating the water comprises means for removing impurities which are ionic and dissolved impurities.

19. The apparatus according to claim 16 wherein said means for treating the water comprises means for removing impurities which are gaseous impurities.

20. The apparatus according to claim 16 wherein said means for treating the water comprises means for removing impurities which are biological impurities.

21. The apparatus according to claim 16 further comprising water temperature control means formed by a pair of thermoelectric hot and cold convection blocks, a DC operated thermoelectric device mounted between the hot and cold convection blocks, and fan means to drive air past said hot and cold convection blocks which causes cooling of and annular outer curtain of air and heating of an axial flow of air.

22. The apparatus according to claim 21 further comprising an electrical heater element for heating the water produced by said apparatus.

23. The apparatus according to claim 21 further comprising water cooling means for cooling the water produced by said apparatus.

24. The apparatus according to claim 16 further comprising:

water flow measuring means.

25. The apparatus according to claim 16 wherein at least one of said cartridges forms a disinfection chamber and water reservoir and comprises:

an ultraviolet lamp encased in a second sleeve to allow for annulus space between the two sleeves whereby cooling air is provided to the lamp, said lamp continuously operating to generate a minimum dosage of 16,00 micro-watt-second per square centimeter of radiating energy at 2537 angstrom.

26. The apparatus according to claim 25 further comprising:

means providing forced convection air draft around said lamp.

27. The apparatus according to claim 16 wherein said valve means comprises:

at least one linear motion valve which, by means of linear movement, opens, isolates or bypasses multiple connections simultaneously thereby controlling direction of flow through the apparatus.

28. The apparatus according to claim 16 having a designed capacity of treating 100–2,000 gallons of local water to provide a minimum capacity of 100 gallons of ultrapure water.

29. The apparatus according to claim 16 wherein flow through each individual cartridge is downward to thereby maintain the water treatment material in a packed condition and prevent if from being washed into the apparatus and to insure flow uniformly throughout the cartridge.

30. The apparatus according to claim 16 further comprising means for expanding said flowboard to accommodate additional cartridges customizing the treatment process for a particular local water condition.

31. The apparatus according to claim 16 further comprising a thermoelectric water cooler and/or an electric hot water heater.

32. The apparatus according to claim 16 further comprising:

cover means enclosing said cartridges and secured to said flowboard.

33. The apparatus according to claim 32 further comprising electric lock means activated by removal of the cover to deenergize all electrically operated flow board mounted elements.

34. The apparatus according to claim 16 further comprising:

system status indication means including alarms and lights to give a visual indication of the proper operation of said apparatus.

35. The apparatus according to claim 34 further comprising:

lapsed time clock means; and flow monitor means.

36. The apparatus according to claim 16 further comprising at least one cartridge for adding water conditioning material, including chlorine and/or flouride, into the water treatment apparatus.

37. An improved apparatus for the treatment of water at a residential point-of-use to remove substantially all of the impurities therefrom making water from substantially any water supply safe for human consumption, said apparatus comprising:

a flowboard having a housing containing a plurality of cartridge mounting assemblies circuit means and valve means within said flowboard connecting said cartridge mounting assemblies forming a series flow circuit sequentially through said mounting assemblies from an inlet to an outlet, said valve means controlling the direction of flow through said apparatus, each said mounting assembly being exposed from one side of said flowboard, a water treatment cartridge received in each said mounting assembly, each said water treatment cartridge containing therein means to treat water to remove at least one specific impurity normally found in untreated water.

38. An improved apparatus for on-site treatment of water in accordance with claim 37 wherein said cartridge mounting assemblies comprise:

a housing having a cylindrical cartridge receiving socket blind bore with a cylindrical sleeve fixed coaxially therein to define an inner axial chamber and an outer annular chamber coaxial around said axial chamber, a first port providing fluid communication only with said inner chamber and a second port providing communication with only said annular chamber whereby water can be inserted axially into an associated water treatment cartridge and retrieved annularly from said cartridge or vice versa.

39. An improved apparatus for the on-site treatment of water in accordance with claim 38 wherein said cartridge mounting assemblies further comprise:

means for detachably receiving a respective water treatment cartridge by one end vertically therein.

40. An improved apparatus for the on-site treatment of water in accordance with claim 39 further comprising:

sealing means for providing water tight seals between said axial chamber and said annular chamber and a respective water treatment cartridge received vertically thereon.

41. An improved apparatus for on-site treatment of water according to claim 37 wherein said valve means comprises:

at least one linear valve having an elongated housing with an axial bore therein, an elongated valve member extending the length of said bore, means to move said valve member axially along said bore, a plurality of ports intersecting said bore at spaced locations, and valve means secured on said valve member disposed so that movement of said valve member along said bore allows and/or prevents fluid communication between various of said ports.

* * * * *